United States Patent
Borland et al.

(10) Patent No.: US 9,092,594 B2
(45) Date of Patent: Jul. 28, 2015

(54) NODE CARD MANAGEMENT IN A MODULAR AND LARGE SCALABLE SERVER SYSTEM

(75) Inventors: David Borland, Austin, TX (US); Arnold Thomas Schnell, Pflugerville, TX (US); Mark Davis, Austin, TX (US)

(73) Assignee: III Holdings 2, LLC, Wilmington, DE (US)

( * ) Notice: Subject to any disclaimer, the term of this patent is extended or adjusted under 35 U.S.C. 154(b) by 134 days.

(21) Appl. No.: 13/527,505

(22) Filed: Jun. 19, 2012

(65) Prior Publication Data

US 2013/0111230 A1     May 2, 2013

Related U.S. Application Data

(60) Provisional application No. 61/553,555, filed on Oct. 31, 2011.

(51) Int. Cl.
*G06F 1/00*     (2006.01)
*G06F 15/78*    (2006.01)

(52) U.S. Cl.
CPC ......... *G06F 15/7803* (2013.01); *Y02B 60/1207* (2013.01); *Y02B 60/1225* (2013.01)

(58) Field of Classification Search
CPC ... H04L 41/0659; H04L 49/15; G06F 1/3203; G06F 13/40; G06F 2213/0012; G06F 2213/0026; G06F 13/4081; H04B 10/00
USPC .......................................................... 713/300
See application file for complete search history.

(56) References Cited

U.S. PATENT DOCUMENTS

| | | |
|---|---|---|
| 5,451,936 A | 9/1995 | Yang et al. |
| 5,594,908 A | 1/1997 | Hyatt |
| 5,623,641 A | 4/1997 | Kadoyashiki |
| 5,781,187 A | 7/1998 | Gephardt et al. |
| 5,901,048 A | 5/1999 | Hu |
| 5,908,468 A | 6/1999 | Hartmann |
| 5,968,176 A | 10/1999 | Nessett et al. |
| 5,971,804 A | 10/1999 | Gallagher et al. |
| 6,141,214 A | 10/2000 | Ahn |
| 6,181,699 B1 | 1/2001 | Crinion et al. |

(Continued)

FOREIGN PATENT DOCUMENTS

| | | |
|---|---|---|
| JP | 2005-223753 | 8/2005 |
| JP | 2005-536960 | 12/2005 |

(Continued)

OTHER PUBLICATIONS

From AT to BTX: Motherboard Form Factor, Webopedia, Apr. 29, 2005, p. 1.*
Comparing the I2C Bus to the SMBus, Maxim Integrated, Dec. 1, 2000, p. 1.*
PCT International Search Report of PCT/US12/62608; dated Jan. 18, 2013.
PCT Written Opinion of the International Searching Authority of PCT/US12/62608; dated Jan. 18, 2013.
Final Office Action on U.S. Appl. No. 13/475,713, mailed Oct. 17, 2014.

(Continued)

*Primary Examiner* — Thomas Lee
*Assistant Examiner* — Santosh R Poudel

(57) ABSTRACT

A system board includes a substrate with one or more connectors. A set of power signals and a set of communication signals are communicated between the one or more connectors. The system board also includes one or more physical connections that connect to an outside entity. The system board further includes one or more node cards. Each node card connects to at least one of the one or more connectors, and each node card is configured to receive power from the set of power signals and communicate using the set of communication signals.

41 Claims, 10 Drawing Sheets

(56) References Cited

U.S. PATENT DOCUMENTS

| Patent No. | | Date | Inventor | Ref |
|---|---|---|---|---|
| 6,192,414 B1 | * | 2/2001 | Horn | 709/239 |
| 6,314,501 B1 | | 11/2001 | Gulick et al. | |
| 6,373,841 B1 | | 4/2002 | Goh et al. | |
| 6,446,192 B1 | | 9/2002 | Narasimhan et al. | |
| 6,452,809 B1 | * | 9/2002 | Jackson et al. | 361/796 |
| 6,507,586 B1 | | 1/2003 | Satran et al. | |
| 6,574,238 B1 | | 6/2003 | Thrysoe | |
| 6,711,691 B1 | | 3/2004 | Howard et al. | |
| 6,766,389 B2 | | 7/2004 | Hayter et al. | |
| 6,813,676 B1 | | 11/2004 | Henry et al. | |
| 6,816,750 B1 | | 11/2004 | Klaas | |
| 6,842,430 B1 | | 1/2005 | Melnik | |
| 6,857,026 B1 | | 2/2005 | Cain | |
| 6,963,926 B1 | | 11/2005 | Robinson | |
| 6,963,948 B1 | | 11/2005 | Gulick | |
| 6,977,939 B2 | | 12/2005 | Joy et al. | |
| 6,988,170 B1 | | 1/2006 | Barroso et al. | |
| 6,990,063 B1 | | 1/2006 | Lenoski et al. | |
| 7,020,695 B1 | | 3/2006 | Kundu et al. | |
| 7,032,119 B2 | | 4/2006 | Fung | |
| 7,080,078 B1 | | 7/2006 | Slaughter et al. | |
| 7,080,283 B1 | | 7/2006 | Songer et al. | |
| 7,143,153 B1 | * | 11/2006 | Black et al. | 709/223 |
| 7,165,120 B1 | * | 1/2007 | Giles et al. | 709/249 |
| 7,170,315 B2 | | 1/2007 | Bakker et al. | |
| 7,203,063 B2 | | 4/2007 | Bash et al. | |
| 7,257,655 B1 | * | 8/2007 | Burney et al. | 710/105 |
| 7,263,288 B1 | | 8/2007 | Islam | |
| 7,274,705 B2 | | 9/2007 | Chang et al. | |
| 7,278,582 B1 | | 10/2007 | Siegel et al. | |
| 7,310,319 B2 | | 12/2007 | Awsienko et al. | |
| 7,325,050 B2 | | 1/2008 | O'Connor et al. | |
| 7,337,333 B2 | | 2/2008 | O'Conner et al. | |
| 7,340,777 B1 | | 3/2008 | Szor | |
| 7,353,362 B2 | | 4/2008 | Georgiou et al. | |
| 7,382,154 B2 | | 6/2008 | Ramos et al. | |
| 7,386,888 B2 | | 6/2008 | Liang et al. | |
| 7,418,534 B2 | | 8/2008 | Hayter et al. | |
| 7,437,540 B2 | | 10/2008 | Paolucci et al. | |
| 7,447,147 B2 | | 11/2008 | Nguyen et al. | |
| 7,447,197 B2 | | 11/2008 | Terrell et al. | |
| 7,466,712 B2 | | 12/2008 | Makishima et al. | |
| 7,467,306 B2 | | 12/2008 | Cartes et al. | |
| 7,467,358 B2 | | 12/2008 | Kang et al. | |
| 7,502,884 B1 | | 3/2009 | Shah et al. | |
| 7,519,843 B1 | | 4/2009 | Buterbaugh et al. | |
| 7,555,666 B2 | | 6/2009 | Brundridge et al. | |
| 7,583,661 B2 | | 9/2009 | Chaudhuri | |
| 7,586,841 B2 | | 9/2009 | Vasseur | |
| 7,596,144 B2 | | 9/2009 | Pong | |
| 7,599,360 B2 | | 10/2009 | Edsall et al. | |
| 7,606,225 B2 | | 10/2009 | Xie et al. | |
| 7,606,245 B2 | | 10/2009 | Ma et al. | |
| 7,616,646 B1 | | 11/2009 | Ma et al. | |
| 7,620,057 B1 | | 11/2009 | Aloni et al. | |
| 7,657,677 B2 | * | 2/2010 | Huang et al. | 710/100 |
| 7,657,756 B2 | | 2/2010 | Hall | |
| 7,660,922 B2 | | 2/2010 | Harriman | |
| 7,673,164 B1 | | 3/2010 | Agarwal | |
| 7,710,936 B2 | | 5/2010 | Morales Barroso | |
| 7,719,834 B2 | | 5/2010 | Miyamoto et al. | |
| 7,751,433 B2 | | 7/2010 | Dollo et al. | |
| 7,760,720 B2 | | 7/2010 | Pullela et al. | |
| 7,761,687 B2 | | 7/2010 | Blumrich et al. | |
| 7,783,910 B2 | * | 8/2010 | Felter et al. | 713/340 |
| 7,791,894 B2 | * | 9/2010 | Bechtolsheim | 361/752 |
| 7,792,113 B1 | | 9/2010 | Foschiano et al. | |
| 7,796,399 B2 | | 9/2010 | Clayton et al. | |
| 7,801,132 B2 | | 9/2010 | Ofek et al. | |
| 7,802,017 B2 | * | 9/2010 | Uemura et al. | 709/250 |
| 7,831,839 B2 | | 11/2010 | Hatakeyama | |
| 7,840,703 B2 | | 11/2010 | Arimilli et al. | |
| 7,865,614 B2 | | 1/2011 | Lu et al. | |
| 7,925,795 B2 | | 4/2011 | Tamir et al. | |
| 7,975,110 B1 | | 7/2011 | Spaur et al. | |
| 7,991,817 B2 | | 8/2011 | Dehon et al. | |
| 7,991,922 B2 | | 8/2011 | Hayter et al. | |
| 7,992,151 B2 | | 8/2011 | Warrier et al. | |
| 8,019,832 B2 | | 9/2011 | De Sousa et al. | |
| 8,060,760 B2 | | 11/2011 | Shetty et al. | |
| 8,060,775 B1 | | 11/2011 | Sharma et al. | |
| 8,082,400 B1 | | 12/2011 | Chang et al. | |
| 8,108,508 B1 | | 1/2012 | Goh et al. | |
| 8,122,269 B2 | | 2/2012 | Houlihan et al. | |
| 8,132,034 B2 | | 3/2012 | Lambert et al. | |
| 8,156,362 B2 | | 4/2012 | Branover et al. | |
| 8,165,120 B2 | | 4/2012 | Maruccia et al. | |
| 8,170,040 B2 | | 5/2012 | Konda | |
| 8,180,996 B2 | | 5/2012 | Fullerton et al. | |
| 8,189,612 B2 | | 5/2012 | Lemaire et al. | |
| 8,199,636 B1 | | 6/2012 | Rouyer et al. | |
| 8,205,103 B2 | | 6/2012 | Kazama et al. | |
| 8,379,425 B2 | | 2/2013 | Fukuoka et al. | |
| 8,397,092 B2 | | 3/2013 | Karnowski | |
| RE44,610 E | | 11/2013 | Krakirian et al. | |
| 8,599,863 B2 | | 12/2013 | Davis | |
| 8,684,802 B1 | | 4/2014 | Gross et al. | |
| 8,745,275 B2 | | 6/2014 | Ikeya et al. | |
| 8,745,302 B2 | | 6/2014 | Davis et al. | |
| 8,782,321 B2 | | 7/2014 | Harriman et al. | |
| 8,824,485 B2 | | 9/2014 | Biswas et al. | |
| 8,854,831 B2 | | 10/2014 | Arnouse | |
| 2002/0004912 A1 | | 1/2002 | Fung | |
| 2002/0040391 A1 | | 4/2002 | Chaiken et al. | |
| 2002/0083352 A1 | | 6/2002 | Fujimoto et al. | |
| 2002/0097732 A1 | | 7/2002 | Worster et al. | |
| 2002/0107903 A1 | | 8/2002 | Richter et al. | |
| 2002/0124128 A1 | * | 9/2002 | Qiu | 710/302 |
| 2002/0159452 A1 | | 10/2002 | Foster et al. | |
| 2002/0186656 A1 | | 12/2002 | Vu | |
| 2002/0194412 A1 | * | 12/2002 | Bottom | 710/302 |
| 2003/0007493 A1 | | 1/2003 | Oi et al. | |
| 2003/0033547 A1 | * | 2/2003 | Larson et al. | 713/300 |
| 2003/0041266 A1 | | 2/2003 | Ke et al. | |
| 2003/0076832 A1 | | 4/2003 | Ni | |
| 2003/0093255 A1 | * | 5/2003 | Freyensee et al. | 703/13 |
| 2003/0093624 A1 | | 5/2003 | Arimilli et al. | |
| 2003/0110262 A1 | | 6/2003 | Hasan et al. | |
| 2003/0140190 A1 | * | 7/2003 | Mahony et al. | 710/302 |
| 2003/0158940 A1 | | 8/2003 | Leigh | |
| 2003/0159083 A1 | | 8/2003 | Fukuhara et al. | |
| 2003/0172191 A1 | * | 9/2003 | Williams | 709/253 |
| 2003/0193402 A1 | | 10/2003 | Post et al. | |
| 2003/0202520 A1 | | 10/2003 | Witkowski et al. | |
| 2003/0231624 A1 | | 12/2003 | Alappat et al. | |
| 2004/0030938 A1 | | 2/2004 | Barr et al. | |
| 2004/0068676 A1 | * | 4/2004 | Larson et al. | 714/31 |
| 2004/0111612 A1 | | 6/2004 | Choi et al. | |
| 2004/0141521 A1 | | 7/2004 | George | |
| 2004/0165588 A1 | | 8/2004 | Pandya | |
| 2004/0210693 A1 | | 10/2004 | Zeitler et al. | |
| 2004/0215864 A1 | * | 10/2004 | Arimilli et al. | 710/302 |
| 2004/0215991 A1 | | 10/2004 | McAfee et al. | |
| 2004/0267486 A1 | | 12/2004 | Percer et al. | |
| 2005/0015378 A1 | | 1/2005 | Gammel et al. | |
| 2005/0018604 A1 | | 1/2005 | Dropps et al. | |
| 2005/0018606 A1 | | 1/2005 | Dropps et al. | |
| 2005/0018663 A1 | | 1/2005 | Dropps et al. | |
| 2005/0021606 A1 | * | 1/2005 | Davies et al. | 709/203 |
| 2005/0030954 A1 | | 2/2005 | Dropps et al. | |
| 2005/0033742 A1 | | 2/2005 | Kamvar et al. | |
| 2005/0033890 A1 | * | 2/2005 | Lee | 710/302 |
| 2005/0044195 A1 | | 2/2005 | Westfall | |
| 2005/0077921 A1 | * | 4/2005 | Percer et al. | 326/86 |
| 2005/0105538 A1 | | 5/2005 | Perera et al. | |
| 2005/0240688 A1 | | 10/2005 | Moerman et al. | |
| 2006/0013218 A1 | | 1/2006 | Shore et al. | |
| 2006/0029053 A1 | | 2/2006 | Roberts et al. | |
| 2006/0090025 A1 | | 4/2006 | Tufford et al. | |
| 2006/0136570 A1 | | 6/2006 | Pandya | |
| 2006/0140211 A1 | * | 6/2006 | Huang et al. | 370/466 |
| 2006/0174342 A1 | | 8/2006 | Zaheer et al. | |
| 2006/0248359 A1 | | 11/2006 | Fung | |
| 2006/0259734 A1 | | 11/2006 | Sheu et al. | |

(56) References Cited

U.S. PATENT DOCUMENTS

| | | | |
|---|---|---|---|
| 2006/0265609 A1* | 11/2006 | Fung | 713/300 |
| 2007/0006001 A1* | 1/2007 | Isobe et al. | 713/300 |
| 2007/0076653 A1 | 4/2007 | Park et al. | |
| 2007/0094486 A1* | 4/2007 | Moore et al. | 713/1 |
| 2007/0109968 A1 | 5/2007 | Hussain et al. | |
| 2007/0130397 A1 | 6/2007 | Tsu | |
| 2007/0180310 A1 | 8/2007 | Johnson et al. | |
| 2007/0226795 A1 | 9/2007 | Conti et al. | |
| 2007/0280230 A1 | 12/2007 | Park | |
| 2007/0286009 A1 | 12/2007 | Norman | |
| 2007/0288585 A1* | 12/2007 | Sekiguchi et al. | 709/209 |
| 2008/0013453 A1 | 1/2008 | Chiang et al. | |
| 2008/0040463 A1* | 2/2008 | Brown et al. | 709/223 |
| 2008/0052437 A1 | 2/2008 | Loffink et al. | |
| 2008/0059782 A1* | 3/2008 | Kruse et al. | 713/1 |
| 2008/0075089 A1 | 3/2008 | Evans et al. | |
| 2008/0089358 A1* | 4/2008 | Basso et al. | 370/465 |
| 2008/0104264 A1 | 5/2008 | Duerk et al. | |
| 2008/0140771 A1 | 6/2008 | Vass et al. | |
| 2008/0140930 A1 | 6/2008 | Hotchkiss | |
| 2008/0159745 A1* | 7/2008 | Segal | 398/115 |
| 2008/0162691 A1* | 7/2008 | Zhang et al. | 709/224 |
| 2008/0183882 A1 | 7/2008 | Flynn et al. | |
| 2008/0186965 A1 | 8/2008 | Zheng et al. | |
| 2008/0199133 A1 | 8/2008 | Takizawa et al. | |
| 2008/0212273 A1* | 9/2008 | Bechtolsheim | 361/685 |
| 2008/0212276 A1* | 9/2008 | Bottom et al. | 361/686 |
| 2008/0217021 A1 | 9/2008 | Lembcke et al. | |
| 2008/0222434 A1 | 9/2008 | Shimizu et al. | |
| 2008/0235443 A1 | 9/2008 | Chow et al. | |
| 2008/0243634 A1 | 10/2008 | Dworkin et al. | |
| 2008/0250181 A1* | 10/2008 | Li et al. | 710/302 |
| 2008/0259555 A1* | 10/2008 | Bechtolsheim et al. | 361/686 |
| 2008/0259788 A1 | 10/2008 | Wang et al. | |
| 2008/0266793 A1 | 10/2008 | Lee | |
| 2008/0288660 A1 | 11/2008 | Balasubramanian et al. | |
| 2008/0288664 A1 | 11/2008 | Pettey et al. | |
| 2008/0288683 A1 | 11/2008 | Ramey | |
| 2008/0301794 A1 | 12/2008 | Lee | |
| 2008/0313369 A1* | 12/2008 | Verdoorn et al. | 710/62 |
| 2008/0320161 A1 | 12/2008 | Maruccia et al. | |
| 2009/0021907 A1 | 1/2009 | Mann et al. | |
| 2009/0044036 A1 | 2/2009 | Merkin | |
| 2009/0064287 A1 | 3/2009 | Bagepalli et al. | |
| 2009/0080428 A1 | 3/2009 | Witkowski et al. | |
| 2009/0097200 A1 | 4/2009 | Sharma et al. | |
| 2009/0113130 A1* | 4/2009 | He et al. | 711/118 |
| 2009/0133129 A1 | 5/2009 | Jeong et al. | |
| 2009/0135751 A1 | 5/2009 | Hodges et al. | |
| 2009/0135835 A1 | 5/2009 | Gallatin et al. | |
| 2009/0158070 A1 | 6/2009 | Gruendler | |
| 2009/0172423 A1 | 7/2009 | Song et al. | |
| 2009/0198958 A1 | 8/2009 | Arimilli et al. | |
| 2009/0204834 A1 | 8/2009 | Hendin et al. | |
| 2009/0204837 A1 | 8/2009 | Raval et al. | |
| 2009/0219827 A1 | 9/2009 | Chen et al. | |
| 2009/0222884 A1 | 9/2009 | Shaji et al. | |
| 2009/0225751 A1 | 9/2009 | Koenck et al. | |
| 2009/0235104 A1* | 9/2009 | Fung | 713/324 |
| 2009/0248943 A1* | 10/2009 | Jiang et al. | 710/313 |
| 2009/0259863 A1* | 10/2009 | Williams et al. | 713/323 |
| 2009/0259864 A1* | 10/2009 | Li et al. | 713/323 |
| 2009/0265045 A1 | 10/2009 | Coxe, III | |
| 2009/0271656 A1 | 10/2009 | Yokota et al. | |
| 2009/0276666 A1* | 11/2009 | Haley et al. | 714/47 |
| 2009/0279518 A1 | 11/2009 | Falk et al. | |
| 2009/0282274 A1 | 11/2009 | Langgood et al. | |
| 2009/0282419 A1 | 11/2009 | Mejdrich et al. | |
| 2010/0005331 A1 | 1/2010 | Somasundaram et al. | |
| 2010/0008038 A1 | 1/2010 | Coglitore | |
| 2010/0008365 A1 | 1/2010 | Porat | |
| 2010/0026408 A1 | 2/2010 | Shau | |
| 2010/0040053 A1 | 2/2010 | Gottumukkula et al. | |
| 2010/0049822 A1 | 2/2010 | Davies et al. | |
| 2010/0051391 A1* | 3/2010 | Jahkonen | 187/393 |
| 2010/0106987 A1* | 4/2010 | Lambert et al. | 713/320 |
| 2010/0118880 A1 | 5/2010 | Kunz et al. | |
| 2010/0125742 A1 | 5/2010 | Ohtani | |
| 2010/0125915 A1 | 5/2010 | Hall et al. | |
| 2010/0138481 A1 | 6/2010 | Behrens | |
| 2010/0161909 A1 | 6/2010 | Nation et al. | |
| 2010/0165983 A1 | 7/2010 | Aybay et al. | |
| 2010/0169479 A1 | 7/2010 | Jeong et al. | |
| 2010/0218194 A1 | 8/2010 | Dallman et al. | |
| 2010/0220732 A1 | 9/2010 | Hussain et al. | |
| 2010/0250914 A1* | 9/2010 | Abdul et al. | 713/100 |
| 2010/0265650 A1* | 10/2010 | Chen et al. | 361/679.33 |
| 2010/0281246 A1* | 11/2010 | Bristow et al. | 713/100 |
| 2010/0299548 A1* | 11/2010 | Chadirchi et al. | 713/340 |
| 2010/0308897 A1 | 12/2010 | Evoy et al. | |
| 2010/0312910 A1 | 12/2010 | Lin et al. | |
| 2010/0312969 A1 | 12/2010 | Yamazaki et al. | |
| 2010/0318812 A1 | 12/2010 | Auradkar et al. | |
| 2011/0023104 A1 | 1/2011 | Franklin | |
| 2011/0026397 A1 | 2/2011 | Saltsidis et al. | |
| 2011/0029652 A1* | 2/2011 | Chhuor et al. | 709/223 |
| 2011/0075369 A1* | 3/2011 | Sun et al. | 361/700 |
| 2011/0090633 A1 | 4/2011 | Rabinovitz | |
| 2011/0103391 A1 | 5/2011 | Davis et al. | |
| 2011/0119344 A1 | 5/2011 | Eustis | |
| 2011/0123014 A1 | 5/2011 | Smith | |
| 2011/0138046 A1* | 6/2011 | Bonnier et al. | 709/226 |
| 2011/0191514 A1* | 8/2011 | Wu et al. | 710/301 |
| 2011/0191610 A1 | 8/2011 | Agarwal et al. | |
| 2011/0197012 A1 | 8/2011 | Liao et al. | |
| 2011/0210975 A1 | 9/2011 | Wong et al. | |
| 2011/0271159 A1* | 11/2011 | Ahn et al. | 714/724 |
| 2011/0273840 A1 | 11/2011 | Chen | |
| 2011/0295991 A1 | 12/2011 | Aida | |
| 2011/0296141 A1 | 12/2011 | Daffron | |
| 2011/0320690 A1 | 12/2011 | Petersen et al. | |
| 2012/0020207 A1 | 1/2012 | Corti et al. | |
| 2012/0050981 A1* | 3/2012 | Xu et al. | 361/679.33 |
| 2012/0054469 A1 | 3/2012 | Ikeya et al. | |
| 2012/0081850 A1* | 4/2012 | Regimbal et al. | 361/679.02 |
| 2012/0096211 A1 | 4/2012 | Davis et al. | |
| 2012/0099265 A1 | 4/2012 | Reber | |
| 2012/0131201 A1* | 5/2012 | Matthews et al. | 709/226 |
| 2012/0155168 A1 | 6/2012 | Kim et al. | |
| 2012/0198252 A1* | 8/2012 | Kirschtein et al. | 713/310 |
| 2012/0297042 A1* | 11/2012 | Davis et al. | 709/223 |
| 2013/0010639 A1* | 1/2013 | Armstrong et al. | 370/254 |
| 2013/0094499 A1 | 4/2013 | Davis et al. | |
| 2013/0097448 A1 | 4/2013 | Davis et al. | |
| 2013/0148667 A1 | 6/2013 | Hama et al. | |
| 2013/0163605 A1 | 6/2013 | Chandra et al. | |
| 2013/0290650 A1 | 10/2013 | Chang et al. | |
| 2015/0039840 A1* | 2/2015 | Chandra et al. | 711/147 |

FOREIGN PATENT DOCUMENTS

| | | |
|---|---|---|
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Final Office Action on U.S. Appl. No. 13/475,722, mailed Oct. 20, 2014.

Non-Final Office Action on U.S. Appl. No. 13/234,054, mailed Oct. 23, 2014.

Non-Final Office Action on U.S. Appl. No. 13/662,759, mailed Nov. 6, 2014.

Non-Final Office Action on U.S. Appl. No. 12/889,721, mailed Sep. 29, 2014.

Advanced Switching Technology Tech Brief, published 2005, 2 pages.

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Deering, "IP Multicast Extensions for 4.3BSD UNIX and related Systems," Jun. 1999, 5 pages.

(56) References Cited

OTHER PUBLICATIONS

Extended European Search Report for EP 10827330.1, mailed Jun. 5, 2013.
Final Office Action on U.S. Appl. No. 12/889,721, mailed Apr. 17, 2014.
Final Office Action on U.S. Appl. No. 12/794,996, mailed Jun. 19, 2013.
Final Office Action on U.S. Appl. No. 13/624,725, mailed Nov. 13, 2013.
Final Office Action on U.S. Appl. No. 13/624,731, mailed Jul. 25, 2014.
Final Office Action on U.S. Appl. No. 13/705,340, mailed Aug. 2, 2013.
Final Office Action on U.S. Appl. No. 13/705,414, mailed Aug. 9, 2013.
Final Office Action on U.S. Appl. No. 13/624,731, mailed Nov. 12, 2013.
fpga4fun.com,"What is JTAG?", 2 pages, Jan. 31, 2010.
HP Virtual Connect Traffic Flow—Technology brief, Jan. 2012, 22 pages.
International Preliminary Report on Patentability for PCT/US2009/044200, mailed Nov. 17, 2010.
International Preliminary Report on Patentability for PCT/US2012/038986 issued on Nov. 26, 2013.
International Preliminary Report on Patentability for PCT/US2012/061747, mailed Apr. 29, 2014.
International Preliminary Report on Patentability issued on PCT/US12/62608, issued May 6, 2014.
International Search Report and Written Opinion for PCT/US12/38987, mailed Aug. 16, 2012.
International Search Report and Written Opinion for PCT/US12/61747, mailed Mar. 1, 2013.
International Search Report and Written Opinion for PCT/US2010/053227, mailed May 10, 2012.
International Search Report and Written Opinion for PCT/US2011/051996, mailed Jan. 19, 2012.
International Search Report and Written Opinion on PCT/US09/44200, mailed Jul. 1, 2009.
International Search Report and Written Opinion on PCT/US2012/038986, mailed Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, mailed Feb. 21, 2014.
Non-Final Office Action on U.S. Appl. No. 12/889,721, mailed Jul. 2, 2013.
Non-Final Office Action on U.S. Appl. No. 13/475,722, mailed Jan. 17, 2014.
Non-Final Office Action on U.S. Appl. No. 12/794,996, mailed Sep. 17, 2012.
Non-Final Office Action on U.S. Appl. No. 12/889,721, mailed Oct. 11, 2012.
Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/475,713, mailed Apr. 1, 2014.
Non-Final Office Action on U.S. Appl. No. 13/527,498, Mailed May 8, 2014.
Non-Final Office Action on U.S. Appl. No. 13/624,725, mailed Jan. 10, 2013.
Non-final office action on U.S. Appl. No. 13/624,731 mailed Jan. 29, 2013.
Non-Final Office Action on U.S. Appl. No. 13/692,741, mailed Sep. 4, 2014.
Non-Final Office Action on U.S. Appl. No. 13/705,286, mailed May 13, 2013.
Non-Final Office Action on U.S. Appl. No. 13/705,340, mailed Mar. 12, 2014.
Non-Final Office Action on U.S. Appl. No. 13/705,340, mailed Mar. 29, 2013.
Non-Final Office Action on U.S. Appl. No. 13/705,414, mailed Apr. 9, 2013.
Non-Final Office Action on U.S. Appl. No. 13/705,428, mailed Jul. 10, 2013.
Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Venaas, "IPv4 Multicast Address Space Registry," 2013, http://www.iana.org/assignments/multicast-addresses/multicast-addresses.xhtml.
Elghany et al., "High Throughput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on CHIP," 2005 IEEE Pacific Rim Conference on Communications, Computers and Signal Processing, Aug. 2005, pp. 613-616.
Non-Final Office Action on U.S. Appl. No. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Final Office Action on U.S. Appl. No. 13/527,498, mailed Nov. 17, 2014.
Notice of Allowance on U.S. Appl. No. 13/705,340, mailed Dec. 3, 2014.
Final Office Action on U.S. Application 13/692741, mailed Mar. 11, 2015 (104985-0261).
Non-Final Office Action on U.S. Appl. No. 14/106698, mailed Feb. 12, 2015.
Notice of Allowance on U.S. Appl. No. 13/475713, mailed Feb. 5, 2015.
Notice of Allowance on U.S. Appl. No. 13/475722, mailed Feb. 27, 2015.
Notice of Allowance on U.S. Appl. No. 13/527498, mailed Feb. 23, 2015.
Notice of Allowance on U.S. Appl. No. 13/624731, mailed Mar. 5, 2015.
Reexamination Report on Japanese Application 2012-536877, mailed Jan. 22, 2015 (English Translation not available).
Search Report on EP Application 10827330.1, mailed Feb. 12, 2015.
Final Office Action on U.S. Appl. No. 13/234054, mailed Apr. 16, 2015.
Non-Final Office Action on U.S. Appl. No. 13/624725, mailed Apr. 23, 2015.
Non-Final Office Action on U.S. Appl. No. 14/052723, mailed May 1, 2015.
Final Office Action on U.S. Appl. No. 12/889721, mailed May 2, 2015.
Non-Final Office Action on U.S. Appl. No. 13/728308, mailed May 14, 2015.

\* cited by examiner

NODE CARD MANAGEMENT IN A MODULAR AND LARGE SCALABLE SERVER SYSTEM

RELATED APPLICATION/PRIORITY CLAIMS

This application claims the benefit under 35 USC 119(e) of U.S. Provisional Patent Application Ser. No. 61/553,555 filed on Oct. 31, 2011 and entitled "System And Method For Modular Compute Provisioning In Large Scalable Processor Installations", the entirety of which is incorporated herein by reference.

This application is also related to U.S. patent application Ser. No. 13/527,498, filed on the same date and entitled "Node Cards For A System And Method For Modular Compute Provisioning In Large Scalable Processor Installations", the entirety of which is also incorporated herein by reference.

FIELD

The disclosure relates generally to provisioning of modular compute resources within a system design.

BACKGROUND

Server systems generally provide a fixed number of options. For example, there are usually a fixed number of CPU sockets, memory DIMM slots, PCI Express IO slots and a fixed number of hard drive bays, which often are delivered empty as they provide future upgradability. The customer is expected to gauge future needs and select a server chassis category that will serve present and future needs. Historically, and particularly with x86-class servers, predicting the future needs has been achievable because product improvements from one generation to another have been incremental.

With the advent of power optimized, scalable servers, the ability to predict future needs has become less obvious. For example, in this class of high-density, low-power servers within a 2U chassis, it is possible to install 120 compute nodes in an incremental fashion. Using this server as a data storage device, the user may require only 4 compute nodes, but may desire 80 storage drives. Using the same server as a pure compute function focused on analytics, the user may require 120 compute nodes and no storage drives. The nature of scalable servers lends itself to much more diverse applications which require diverse system configurations. As the diversity increases over time, the ability to predict the system features that must scale becomes increasingly difficult.

It is desirable to provide smaller sub-units of a computer system that are modular and can be connected to each other to form larger, highly configurable scalable servers. Thus, it is desirable to create a system and method to modularly scale compute resources in these power-optimized, high density, scalable servers.

DETAILED DESCRIPTION OF ONE OR MORE EMBODIMENTS

The disclosure is particularly applicable to examples of the system board and node cards illustrated and described below and it is in this context that the disclosure will be described. It will be appreciated, however, that the disclosure has broader applicability since the disclosed system and node cards can be implemented in different manners that are within the scope of the disclosure and may be used for any application since all of the various applications in which the system and node cards may be used are within the scope of the disclosure.

Figure 1A:
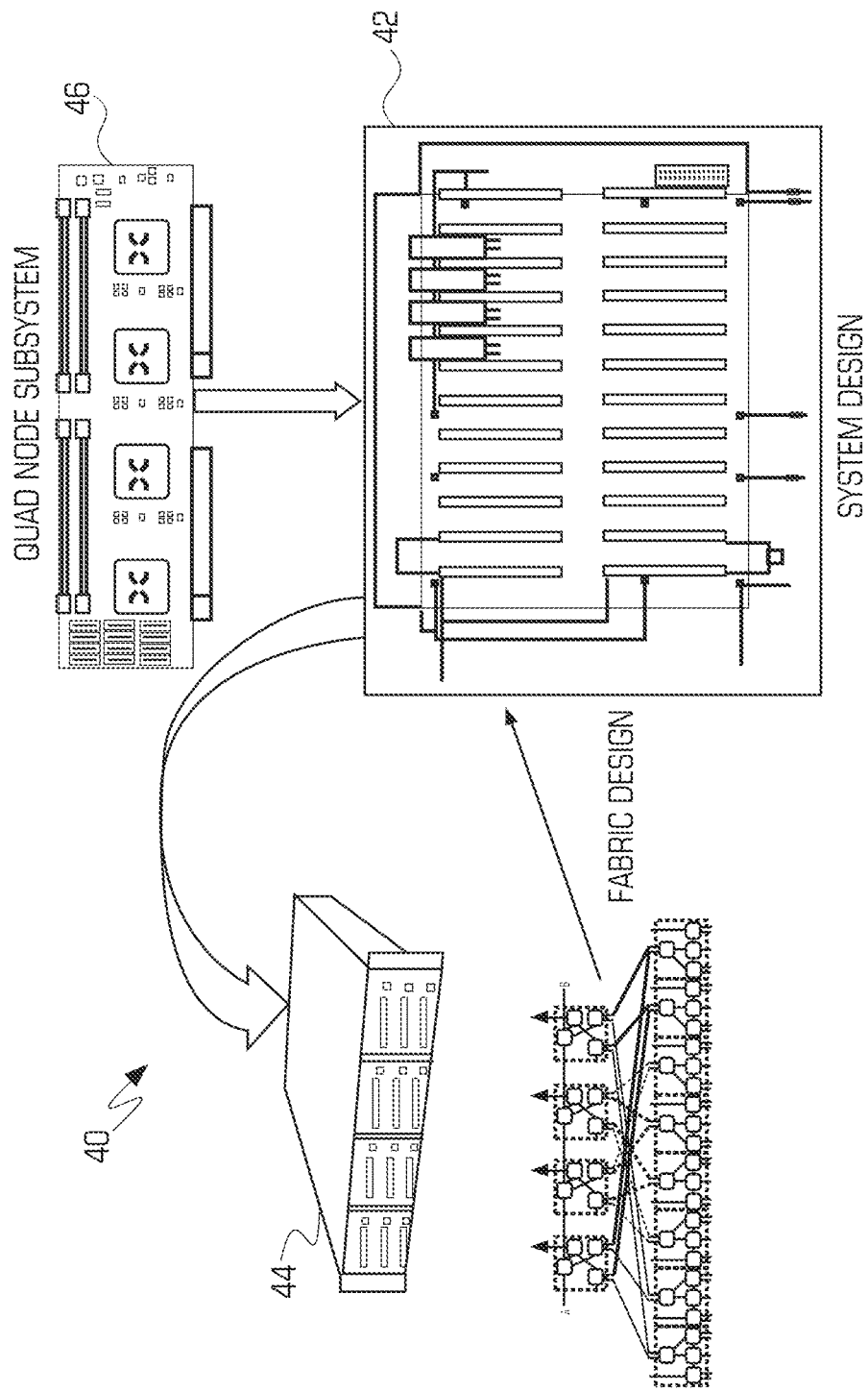
FIG. 1A illustrates an example of a system board on which one or more node cards may be installed.

FIG. 1A illustrates an example of a system 40 that may include a system board 42 on which one or more node cards may be installed. The system board 42 may be fit into a typical server chassis 44 and the system board may have one or more node card units 46 (described below with reference to FIG. 2) plugged into the system board. There are a number of functions that are needed to complete a full classic server which includes Ethernet PHYs to interface the one or more node cards 46 or a cluster of node cards and server control functions (fan control, buttons etc. . . . ). The system board 42 is the component that ties the node cards 46 to these components. The system board 42 is desirable if a hierarchical hardware partition is desired where the "building block" is smaller than the desired system, or when the "building block" is not standalone. The system board roles can include: Ethernet network connectivity, internal fabric connections between node cards or groups node cards in a sub-system (the fabric design in FIG. 1) and chassis control and management. The system board is the component that connects the fabric links between node cards and allows them to communicate with the external world. Once the fabric design, hardware partitioning and storage decisions have been made, the system board 42 can glue the system components together and the input/output (I/O) of the system may include: management data input/output (MDIO) for communication with SFP network devices, comboPHYs for internal fabric links, storage and Ethernet access, UART and JTAG ports for debug and SMBus and GPIOs for chassis component control and communication.

The fabric connections on the node card can be designed to balance: usage of SoC PHYs, link redundancy, link bandwidth and flexibility in usage of the 8 links at the edge connectors. A node card can be used in conjunction with the "system board" where the system board provides power to the node cards and connections to interconnect off the system board such as an Ethernet transceiver. The system board could house one or more node cards. In the case of housing more than one node card, the system board creates a cluster of Servers that utilize a server to server interconnect or fabric that is integrated in the SoC or a separate function on the card. This system board can be made in many forms, including industry standard form factors such as ATX or in customer form factors. The system board could be a blade or could fit into a standard chassis such as a 2 U or any other size.

Figure 1B:
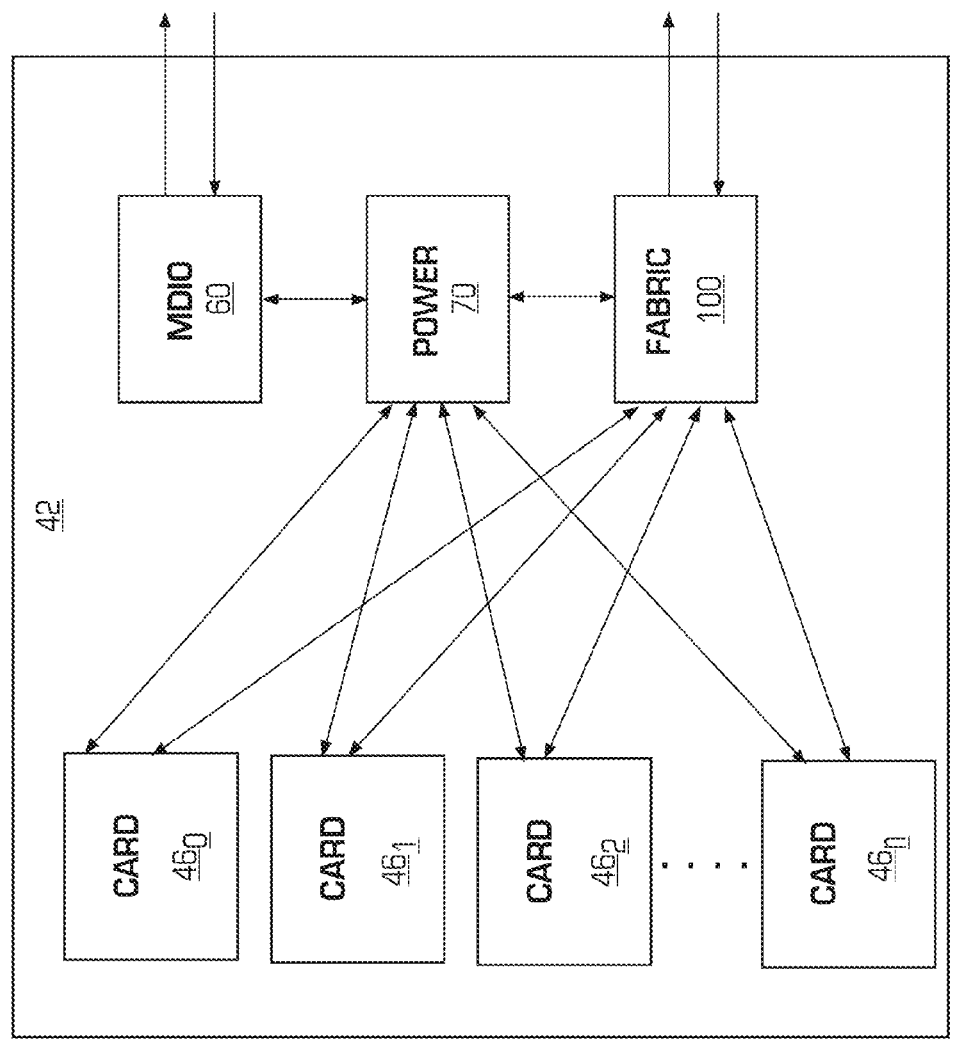
FIG. 1B illustrates more details of the system board.

FIG. 1B illustrates more details of the system board 42. The system board 42 may allow one or more node cards 46 (such as $46_0$, $46_1$, $46_2$, ..., $46n$ in the example in FIG. 1B) to be plugged into the system board. The system board 42 also may house a management data input/output system 60 (described below with reference to FIG. 3) that manages the system board and the node cards, a power system 70 (described below with reference to FIGS. 4-5) that distributes power to the system board 42 as well as the one or more node cards 46 and a switch fabric 100 (described below with reference to FIG. 7) that provide communication paths between the nodes on each node card, between the node cards and to an outside entity such as another system board, other computer system and the like.

Figure 2:
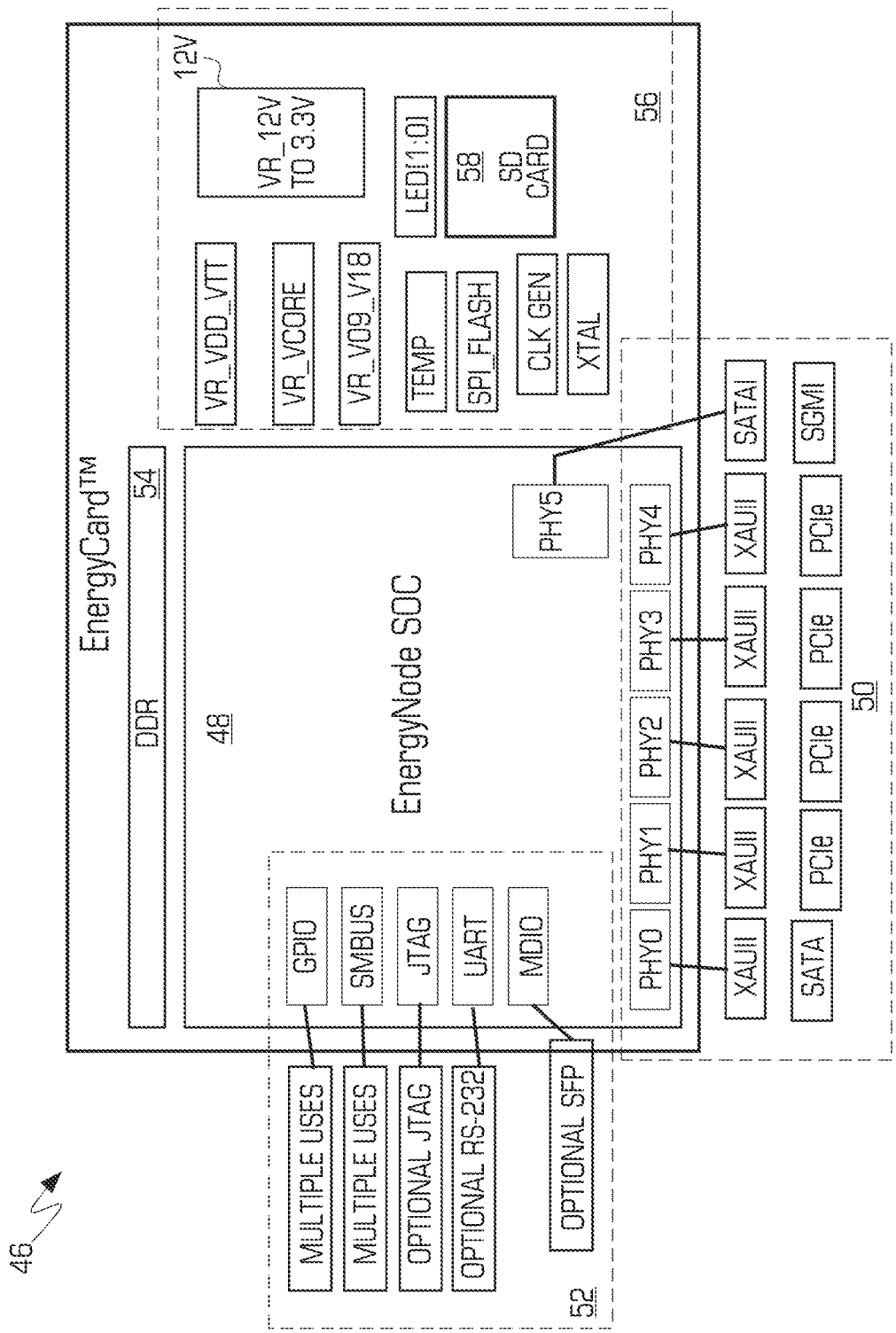
FIG. 2 illustrates an example of a node card that can be coupled to the system board.

FIG. 2 illustrates an example of a node card 46, such as a node card, that can be coupled to the system board. The node card may have a system on a chip (SOC) unit 48, one or more PHYs to various communication and storage paths 50 and one or more other interfaces 52 that were described briefly above. The node card 46 may also have a memory 54, one or more other well known modules 56 (such as a clock, a crystal, a temperature sensor, a regulator and a power source) that are also part of the node card. The node card may also have an SD card unit 58.

Figure 3:
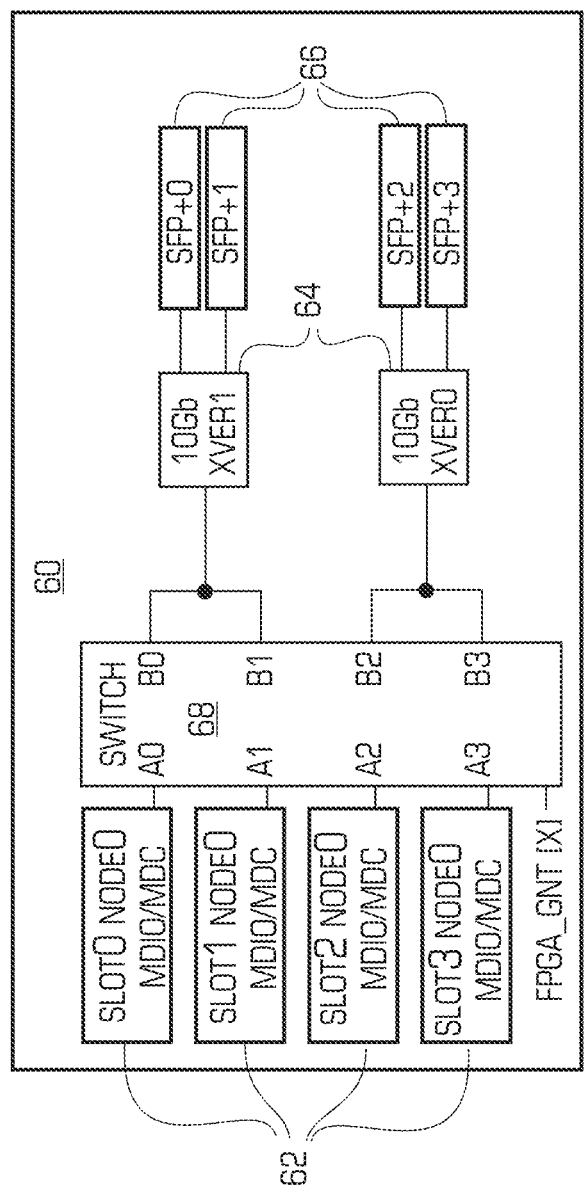
FIG. 3 illustrates the management data input/output (MDIO) of the system board.

FIG. 3 illustrates the management data input/output (MDIO) 60 of the system board. The node card in FIG. 2 can support 1G and 10G Ethernet speeds. For 10G link speeds, a XAUI to SFP+ conversion is required (by a transceiver 64). This example shows 2 SFP+ to XAUI links available so a system board can use 1 or 2 Outlinks. FIG. 3 illustrates the MDIO connectivity 62 for a 4 SFP Outlink 66 SystemBoard design that utilizes a switch 68 to share MDIO signals. FPGA_GNT[X] is the output of an arbiter that allows access by various slots to communicate with SFP devices through an Ethernet PHY transceiver 64.

The system board also provides chassis management mechanism that may include fan control, a chassis user interface (buttons, LEDs, etc.) and system voltage regulation for Ethernet transceivers, node card slots in the system board as shown in FIG. 1 (that provide power to each node card) and SATA devices. Now, an example of a power system of the system board is described in more detail.

Figure 4:
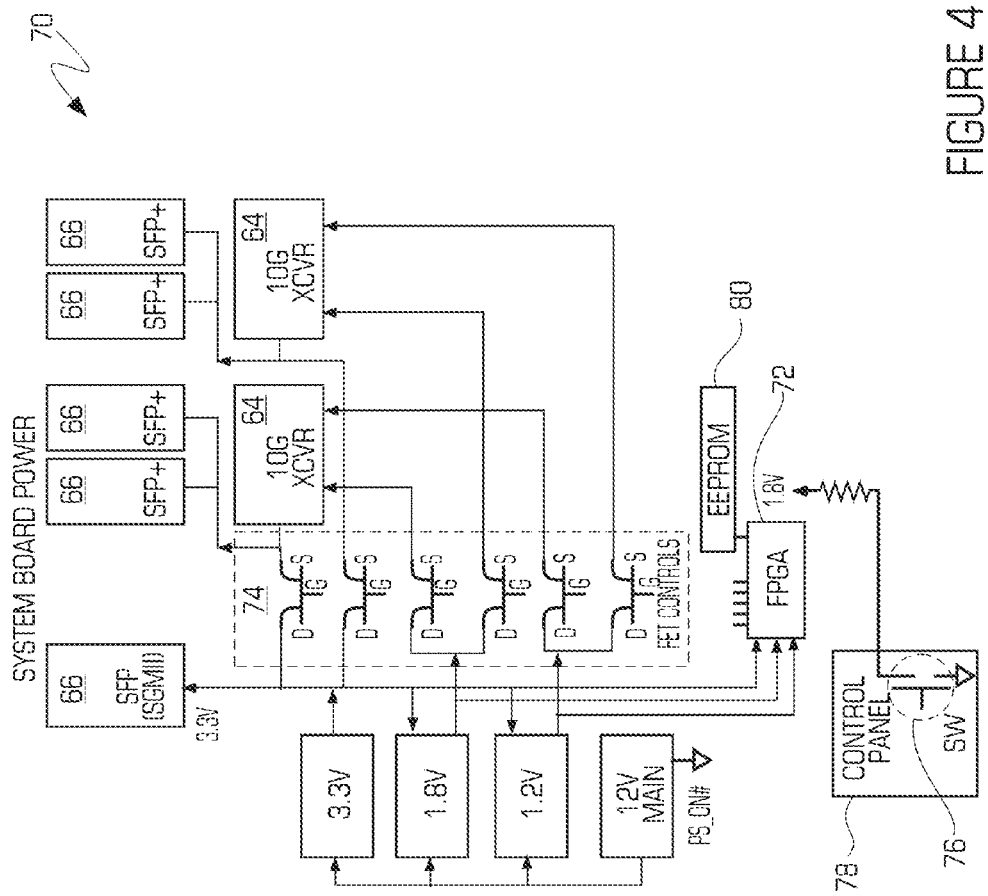
FIGS. 4 and 5 illustrate details of the power system for the system board.
Figure 5:
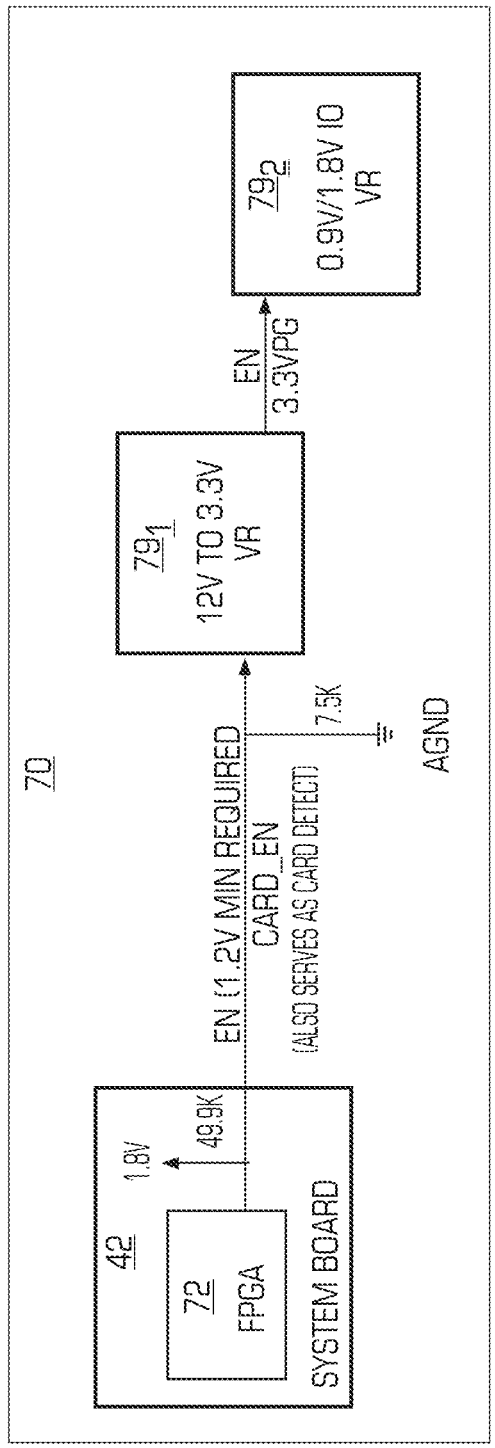

FIGS. 4 and 5 illustrate details of the power system 70 for the system board that, for example, powers the network system 64 and 66. The system board power system should be able to generate and distribute DC voltage requirements of the node cards and system components, have an organized power sequencing, a predetermined power control for each slot and/or system component (always on or under dynamic control) and be able to provide dynamic power control. The system board design utilizes a chassis management unit 72, such as an FPGA, in communication with a node card to meet the proper power-on sequence and dynamic power control of the components. The chassis management unit 72 may be responsible for the power on/off sequence for the chassis and the power system has one or more power FETs 74 that are available to dynamically control the high power Ethernet PHYs and elements of the network system 64,66. The power system may also provide 12V to each slot holding the node cards, such as node card(s), to provide power to each node card. Furthermore, each node card (or multi-node) slot on the system board has a CARD_EN signal (shown for example in FIG. 5) to enable the 3.3V, 1.8V and 0.9V rails to power on/off a node card or node(s) of a node card. In the power system, with the PS_ON# grounded (shown in FIG. 4), the 12V supply may power up the system board when AC power is supplied. A power switch 76 on the control panel 78 turns power on/off to each slot of the system board, but does not remove power from the chassis management unit 72 and a power switch 76 button press causes the chassis management unit 72 to shutdown all slot power.

The power system may have intermediate modes that are controlled by the chassis management unit 72 and those modes are to enable the 10G transceivers 64 or to enable other slots. The lower operational power state of the power system is that the system board is powered, most 10G transceiver power FETs are off, slot 0 is powered and enabled and nodes 1 and 2 on slot 0 are disabled. Minimal network system devices need to remain on such that a single network connection is maintained for slot 0, to provide a communication channel with higher level control systems. For unexpected power loss, the chassis management unit 72 stores the current system power configuration is a local non-volatile storage device 80 and restores that configuration when AC power is restored.

FIG. 5 illustrates more details of the power system 70 with the chassis management unit 72 on the system board 42. The chassis management unit 72 may be connected to one or more regulators 79 that convert and regulate the voltage of the system such as 3.3 volt supply and a 1.8 volt I/O supply.

The chassis can have a number of miscellaneous components related to temperature control (fans and temperature sensors) and user interface (button, LEDs, LCDs). The node card I/O has been defined for communication and control of these components. In the system board design, the chassis management unit 72 serves the role of controlling the fans, user interface features and communication to node card(s) through an SMBus connection. The following functions outlines the node card I/O for system communication and control:

SMBus Clock signal for communication with system board devices.
SMBus Data signal for communication with system board devices.
Interrupt to report a system event to the node.
Report a thermal trip event that occurred external to the node.
For general purpose use with a system board.
CPLD_REQ and CPLD_GNT are used for master arbitration between the nodes.
CPLD_REQ and CPLD_GNT are used for master arbitration between the nodes.

Figure 6:
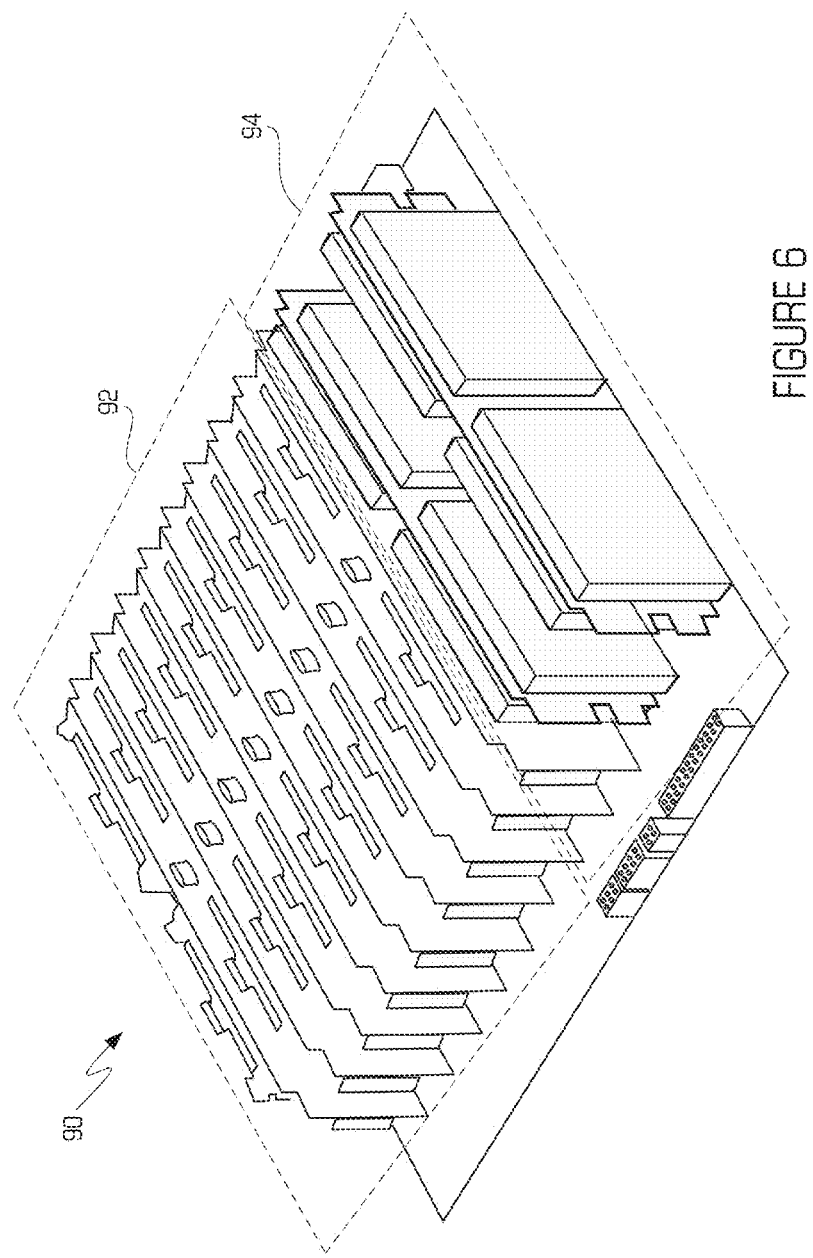
FIG. 6 illustrates an example of an EnergyDrive that can be coupled to the system board.

An SB12 (an example of which is shown in FIG. 6) is a 12 slot system board 80 that accepts a node card per slot (described in co-pending patent application Ser. No. 13/527,498 filed on Jun. 19, 2012, which is incorporated herein by reference.) It is intended for use in a 2U chassis that supports EATX motherboards. While the SB12 is primarily passive for fabric routing, there are still some other functions that it performs that include fabric interconnect between node cards, conversion from XAUI to SFP+ cages (requires a [Tom] Deleting Vitesse because other transceiver suppliers exist also. 10 Gb transceiver) for external network connectivity, local DC voltage regulation, multiplexing of UART signals from slots 1-4 to the external RS-232 port, fan control and/or power sequencing and enable/disable of slots. In the example in FIG. 6, the SB12 has one or more node card quad-node boards 92 and one or more EnergyDrives 94 that are described in more detail in co-pending patent application Ser. No. 13/284,855 filed on Oct. 28, 2011 and entitled "System And Method For Flexible Storage And Networking Provisioning In Large Scalable Processor Installations", the entirety of which is incorporated by reference herein.

Figure 7:
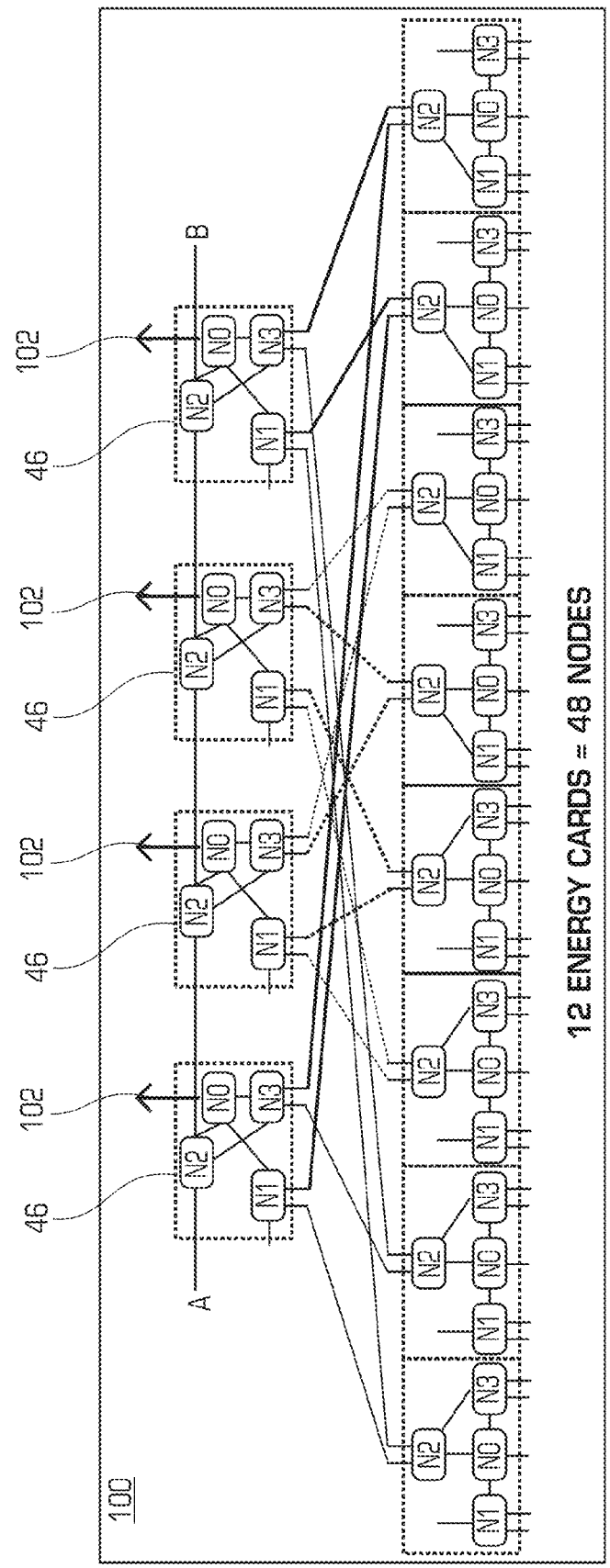
FIG. 7 illustrates details of the fabric interconnect of the system board.

FIG. 7 illustrates details of a fabric interconnect 100 of the system board. The fabric interconnect is designed to balance the need for scalable bandwidth, redundant links, and the physical routing congestion within the system board. There are many other tree topologies that can be implemented at this level. For the conversion from XAUI to SFP+ cages, an Ethernet transceiver is used. In short, a set of arrows 102 in the fabric diagram in FIG. 8 connect to the Vitesse transceiver which then connects to the SFP+ cage. Within the SFP+ cage, the user is free to install a compatible SFP module (1 Gb or 10 Gb), (copper or fiber) to meet their needs. SFP cables with integrated SFP connectors can also be used. The fabric also connects one or more node cards 46 together as well as one or more nodes of each node card (N0-N3) to each other so that they can communicate with each other.

Figure 8:
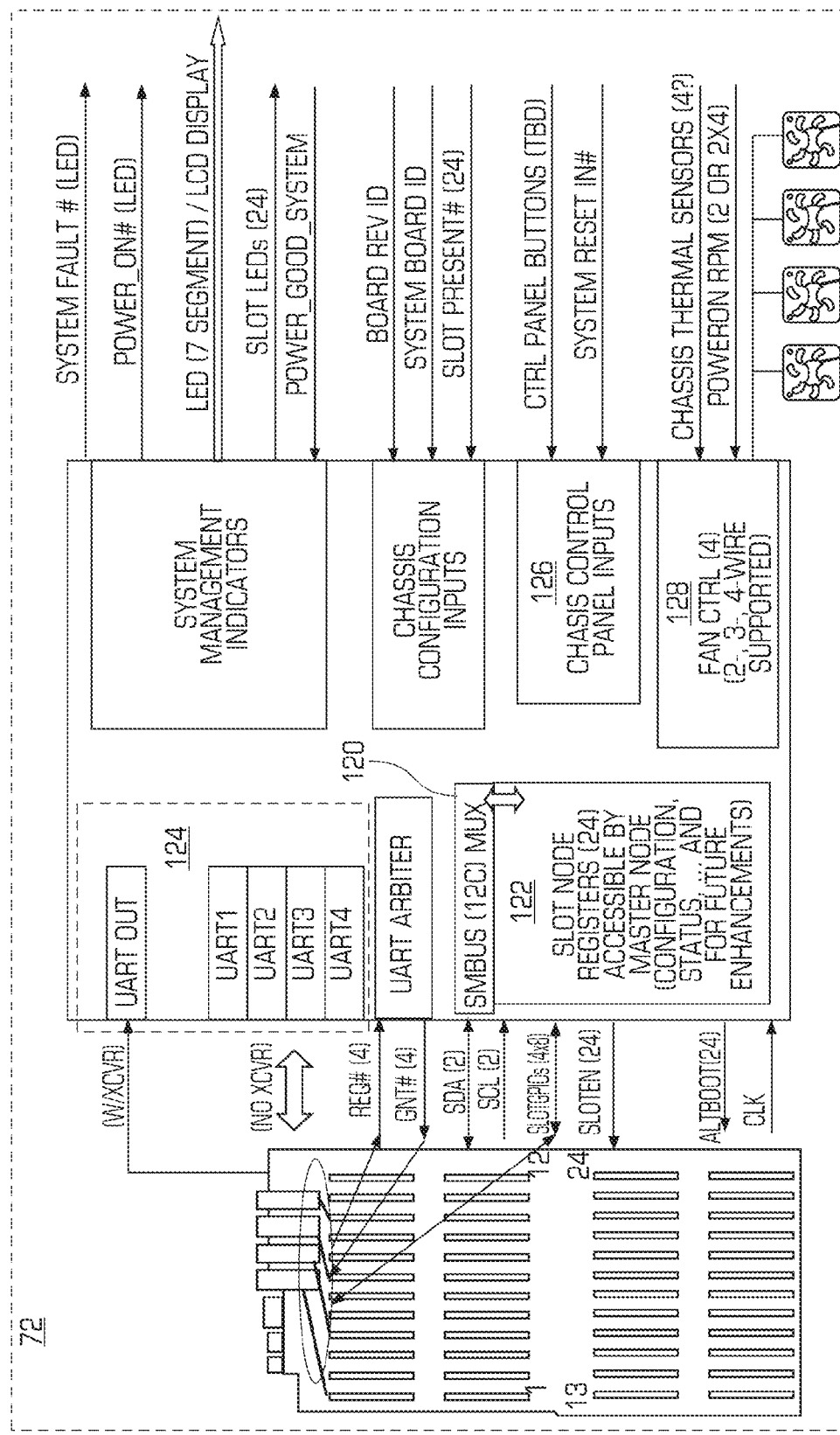
FIG. 8 illustrates details of the chassis management unit of the system board.

FIG. 8 illustrates details of the chassis management unit 72 of the system board. This device will be used on system boards for chassis management functions and node card to system board configuration/coordination. It will work on multiple system boards (1 to 24 slot) without modification, but can be modified if needed, for example, one could use a smaller device on a 3-slot system board (fewer I/Os required). It also can scale upward to support slots quantities that are limited only by the allowable size of the system fabric. In one implementation, the chassis management unit 72 may be a FPGA.

The chassis management unit 72 may have external network slots which are the node card slots that have connections to the system board SFPs for connection to the external network and the internal fabric are the XAUI connections that exist between node card, both on system board cards and between slots in which node cards are installed. The system may have a master node (within one of the node cards) that has been assigned to control the other nodes and/or the other node cards. The master node card is a single node card on a node card installed in an external network slot that is designated to carry out chassis management functions (by way of the Node Controller). If arbitration is supported, node card in another external network slot can be switched to function in this role. The master node card is a system board card that is installed in an External Network Slot and a system Register Space 122 is a common system registers accessible via the node card SMBus 120 (includes bits for things such as chassis reset, power on/off, slot reset. FAULT status, etc.).

The power management of the chassis management unit 72 includes the code and I/O signals to support power-on and reset requirements of system board and node card components. Power on of installed system board cards is controlled by the chassis management unit 72 and the Master node card. The slot power and timing may be hardwired to the chassis management unit 72, but may also be controlled via a Master node card.

The chassis management unit 72 also performs arbitration of system board Resources and the system board resources are accessible by the Master node card at a time by way of chassis management unit 72 controlled arbitration between the 4 master node cards. The GPIOs CPLD_REQ and CPLD_GNT are connected to the node cards through External Network Slots (Slots 0-3).

The MDIO Bus (MII bus) is a shared resource of the master node cards. It is used by the Master node card to access the Media Independent Interface of the Ethernet transceiver for their configuration. Note that one Master node card has the ability to access the MDIO of a transceiver to which it does not connect. The External Slot node cards will need to coordinate to avoid conflicts.

A set of UARTs 124, a system board DB9/RS232 transceiver, is a shared resource of the master node cards. Only the Master node card will have access to the transceiver and be able to use its UART interface to communicate externally from the chassis.

System Board Configuration Inputs

The system board has the following inputs for system configuration that are read by the chassis management unit 62 and made available to Master node card via the System Register Space:

Board Rev ID—Used as needed to provide distinction between board versions/assemblies.

System board ID—Used as needed to provide distinction between different system boards, e.g., between OEM variants of the system board.

Slot Presence—The same signal that is also used to enable power to a slot. When a card is first installed, the chassis management unit 72 will detect its presence by the card's internal pullup to this signal. The chassis management unit 72 will record this presence status in the System Register Space. Furthermore, when the chassis management unit 72 enables power to the slot via this signal, it will drive the line low. The presence state is recalled via the original presence detected and stored into the System Register Space.

The chassis control panel 126 includes any Buttons, LEDs or other device that would be on the chassis for user input. The control panel is driven by the chassis management unit 72 and accessible by the master node card through the System Register Space. Fans are driven by a fan control unit 128 that is part of the chassis management unit 72 and controlled by the Master node card through the System Register Space.

JTAG is used update the firmware image on the chassis management unit 72. This is performed by a JTAG connection between the node card edge connector in Slot 0 and the chassis management unit 72. The other node card slots will not be connected to keep the JTAG bus clean.

The system board may contain multiple physical connectors, contain routing between the physical connectors for power and signaling, and one or more Ethernet physical connections, where the physical connectors connect to a PCB on which is one or more servers. The connectors, in one embodiment, may be PCIe. The routing between the connectors may be using XAUI and/or SGMII. The power may be 12 v where 12 v is generated on the system board from an AC or higher voltage applied to the system board. The system board may be in a chassis that fits in a rack and/or it may be a blade. The system board may include additional systems that can be placed inside the chassis where the power and signal routing goes through a board that is connected with one or more connectors on board forming a bridge without any additional wires. The system board may have an ATX form factor. If SGMII is used, it may be routed from one physical connectors to a 1 Gbit PHY that is used to connect to a standard Ethernet cable. When one or more SGMII signals from additional connector(s) are used, they are routed to additional Ethernet PHYs enabling multiple Ethernet cable to be hooked to the system board. The system board may also have regulation for the Ethernet. The system board also has a device that goes from XAUI to the output that goes to a PHY and/or has SFP cages on it.

In another aspect, a chassis controller 72 may have a system controller that provides enable signaling to each connector. The system controller may be implemented in many ways, such as programmable logic (an FPGA) or cold logic (a standard microcontroller or a fixed-function ASIC). The system controller may be any type of processor with memory and GPIO interface. The system controller may include SMBus arbitration where the chassis manager has the lock that controls the arbitration. In one embodiment, there may be no processor on the system board other than the chassis management unit and the Ethernet transceiver. The chassis controller may have a regulator for Ethernet and Chassis Management unit.

The power button may be routed from chassis to chassis controller so that when power button is pressed one or more node cards is notified and that node card sends a message to all node cards to gracefully shut down. There may be serial port connector so chassis manager can communicate over the serial port to external devices. The system control can enable and control the Ethernet PHYs and node cards. A given node card can have a digital link to the system controller enabling a server within that node card to communicate to or control the system controller. There may also be more than one server within node cards that can communicate with the system controller through one of multiple independent links and a shared digital link. The shared digital link is a SMBus channel with digital controls that enable arbitration of said channel. The system control may have lights and chassis control of slot enable. The connector interface may have power and a digital enable signal. There may be a node card that can control the enable of other servers by giving commands to the chassis manager to enable or disable a server or set of servers in another slot by communicating with the chassis manager who enables or disables a slot through a digital GPIO. In the system, any server can request to be turned of by sending a message to the server connected to the chassis manager that controls the enable.

The system controller or system board may have one or more temperature sensors. The temperature sensors may be connected to the system controller enabling the temperature sensors to be read and controlled by the system controller. The node card can get temperature information by communicating with the system controller, where the system controller gets temperature information from one or more temperature sensors on the system board. In addition, more than one server can get temperature information.

The system board may have outputs that connect to fans. The fan speed can be set by setting DIP switches or other values on the system board independent to the system controller or node cards. There may also be fan(s) on system board. The chassis controller unit may make decisions on fan speed using the temperature sensor input independent of the node cards. In addition, one node card can get temperature information from the chassis manager and make decisions on fan speed and tell the chassis manager how to set up the fans. In other embodiments, the main server can get information from each server on temperature and make a fan decision, then talk to the chassis manager to change fan speed.

The system board may also include drives and SATA and it may houseEnergyDrive, including power and enable. Inclusion of SATA channels within the system board allows connectivity between EnergyDrives and servers within a node card without the use of a multitude of cabling. There may also be disks mounted on the system board that make use of the embedded SATA channels.

Figure 9:
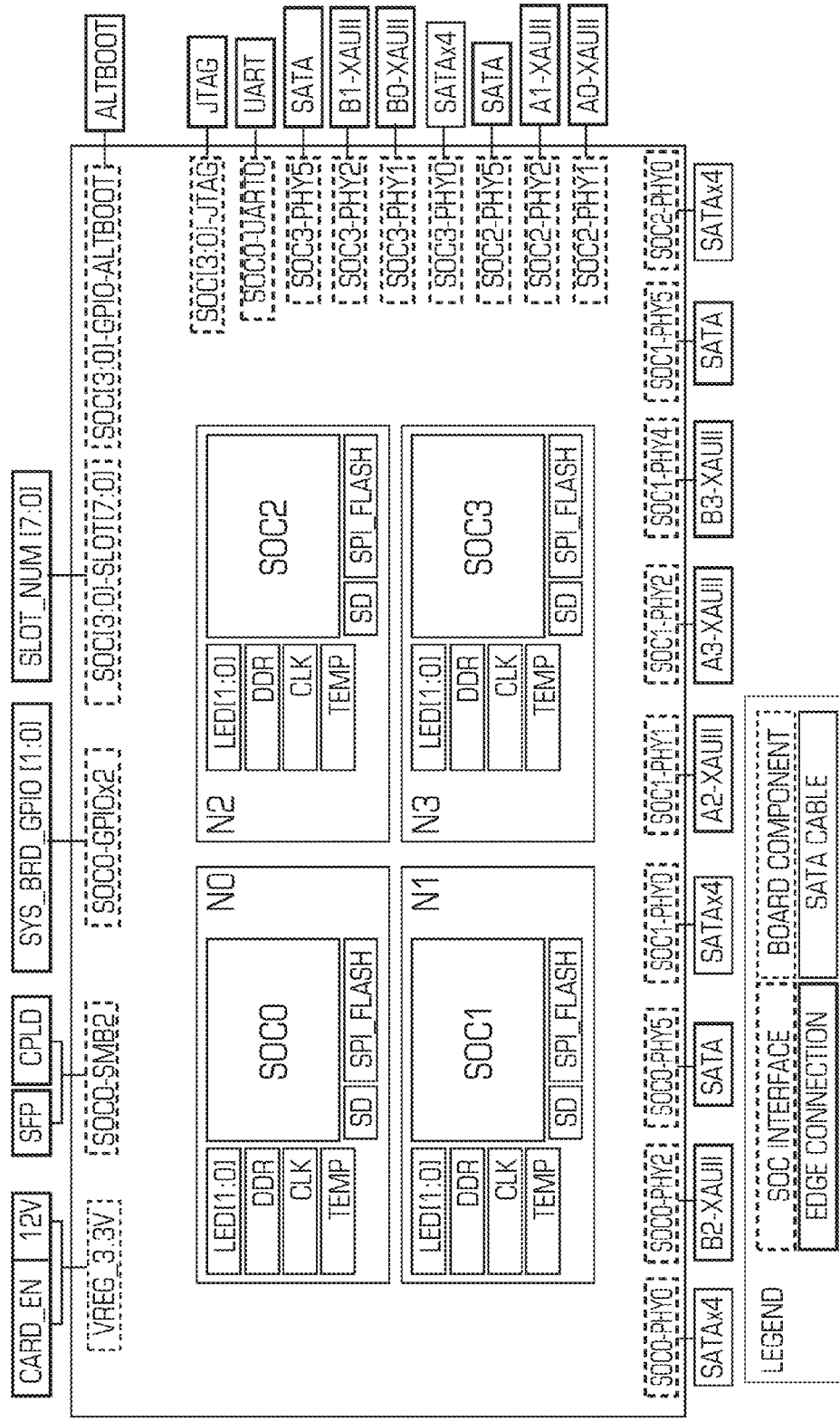
FIG. 9 illustrates an embodiment of the details of each node card.

Now, several different examples of node cards that may be plugged into the system board are described in more detail. A highly integrated SoC designed for Server application enables density and system design options that have not been available to date. Cards can be defined that have the functionality of one or more servers and these Cards can be linked together to form clusters of servers in very dense implementations. A high level description of the Card would include a highly integrated SoC implementing the server functionality, DRAM memory, support circuitry such as voltage regulation, clocks etc. . . . The input/output of the card would be power and server to server interconnect and/or server to Ethernet PHY connectivity. SATA connections can also be added to interface to drives. An example of a node card is shown in FIG. 9 with one or more system-on-a-chip (SOC).

The fabric connections on the Card can be designed to balance: usage of SoC PHYs, link redundancy, link bandwidth and flexibility in usage of multiple links at the edge connectors. The system board could house one or more node cards. In the case of housing more than one Card, the system board creates a cluster of Servers that utilize a server to server interconnect or fabric that is integrated in the SoC or a separate function on the card. This system board can be made in many forms, including industry standard form factors such as ATX or in customer form factors. The system board could be a blade or could fit into a standard chassis such as a 2 U or any other size.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system board, comprising:
a substrate with one or more connectors, wherein a set of power signals and a set of communication signals are configured to be communicated between the one or more connectors;
one or more physical connections configured to connect to an outside entity;
node cards, wherein each node card includes one or more nodes, wherein each node card is configured to connect to at least one of the one or more connectors, and wherein each node card is configured to receive power from the set of power signals and communicate using the set of communication signals;
node to node links, wherein the node to node links are configured to connect the nodes on the node cards together and to provide communication paths between the nodes; and
a chassis management unit configured to detect a presence of a particular node card based on an internal pullup to a power signal by the particular node card, wherein the chassis management unit is further configured to record the presence of the particular node card in a system register.

2. The system board of claim 1, further comprising an interconnect that is configured to interconnect the one or more connectors.

3. The system board of claim 2, wherein the interconnect is one of an extended auxiliary unit interface (XAUI) and a serial gigabit media independent interface (SGMII).

4. The system board of claim 3, wherein the SGMII is routed over the one or more physical connections to a 1 gigabit (Gbit) Ethernet PHY.

5. The system board of claim 3, wherein the one or more connectors are configured to route one or more SGMII signals to the one or more physical connections so that multiple Ethernet cables are hooked to the system board.

6. The system board of claim 3, wherein the XAUI is routed over the one or more physical connections to a 10 gigabit (Gbit) Ethernet PHY.

7. The system board of claim 3, wherein the one or more connectors are configured to route one or more XAUI signals to the one or more physical connections so that multiple Ethernet cables are hooked to the system board.

8. The system board of claim 1, further comprising a chassis that is configured to house the substrate, wherein the chassis is configured to fit into a rack.

9. The system board of claim 8, wherein the chassis is configured to house a system, and wherein the set of power signals and the set of communication signals are configured to pass through a particular node card to form a bridge to the system.

10. The system board of claim 8, further comprising a chassis controller connected to the substrate, wherein the chassis controller is configured to provide an enable signal to each of the one or more connectors.

11. The system board of claim 10, wherein the chassis controller is one of a field programmable gate array, cold logic, programmable logic, and a processor with a memory and general purpose input/output (GPIO) pins.

12. The system board of claim 10, further comprising a serial system management bus (SMBus) interface, and wherein the chassis controller is configured to control arbitration of the serial SMBus interface.

13. The system board of claim 10, further comprising a voltage regulator for the chassis controller.

14. The system board of claim 10, wherein the chassis has a power button that is configured to generate a power button signal that is communicated to the chassis controller, and wherein the chassis controller is configured to send a message to at least one of the node cards to shut down at least one server thereon.

15. The system board of claim 10, wherein each connector is configured to communicate the set of communication signals, the set of power signals, and a digital enable signal to the one or more node cards attached to each connector.

16. The system board of claim 15, wherein each node card has a server, and wherein the chassis controller is configured to enable or disable the server based on the digital enable signal.

17. The system board of claim 16, wherein a master server of a node card is configured to send a command to the chassis controller to enable or disable the server based on the digital enable signal.

18. The system board of claim 17, wherein a particular server on a particular node card is configured to request to be turned off by sending a message to the master server.

19. The system board of claim 1, wherein each connector is a peripheral component interconnect express (PCIe) connector.

20. The system board of claim 1, wherein the substrate has an advanced technology extended (ATX) form factor.

21. The system board of claim 20, wherein each node card further comprises at least one server.

22. The system board of claim 21, wherein the at least one server has a digital link to the system controller, and wherein the at least one server is configured to control and communicate with the system controller.

23. The system board of claim 21, wherein two or more servers each have a digital link to the system controller, and wherein the digital links comprise one of multiple independent links and a shared digital link.

24. The system board of claim 23, wherein the shared digital link is a system management bus (SMBus) interface.

25. The system board of claim 20, wherein the form factor is a blade.

26. The system board of claim 1, further comprising a system controller that is configured to enable and control a physical Ethernet.

27. The system board of claim 1, further comprising a temperature sensor.

28. The system board of claim 27, further comprising a chassis controller connected to the substrate and configured to control the temperature sensor.

29. The system board of claim 28, wherein each node card has a server, and wherein the server is configured to obtain temperature information from the chassis controller.

30. The system board of claim 1, further comprising one or more fans.

31. The system board of claim 30, wherein a speed of each of the one or more fans is independently controlled.

32. The system board of claim 30, further comprising a chassis controller connected to the substrate, wherein the chassis controller is configured to control a speed of the one or more fans.

33. The system board of claim 32, further comprising a temperature sensor on the substrate, wherein the temperature sensor is configured to generate a temperature signal, and wherein the chassis controller is configured to control the speed of the one or more fans based on the temperature signal.

34. The system board of claim 32, further comprising a temperature sensor on the substrate, wherein the temperature sensor is configured to generate a temperature signal, and wherein a server on a particular node card is configured to obtain the temperature signal from the chassis controller and send a command to the chassis controller to control the speed of the one or more fans.

35. The system board of claim 1, further comprising an EnergyDrive connected to the substrate.

36. The system board of claim 35, further comprising one or more serial advanced technology attachment (SATA) connectors configured to route SATA signals over the one or more connectors to the node cards.

37. The system board of claim 1, further comprising a disk drive connected to the substrate.

38. The system board of claim 1, wherein each node card has at least one server and an interconnect between the servers of the node cards to create a cluster of servers.

39. The system board of claim 1, further comprising an RS-232 port.

40. The system board of claim 1, wherein the substrate is a printed circuit board.

41. The system board of claim 1, further comprising a fabric, and wherein the node cards each include a server interconnected by the fabric so that a cluster of servers is created.

* * * * *